(12) United States Patent
Lehmann et al.

(10) Patent No.: US 10,824,970 B1
(45) Date of Patent: Nov. 3, 2020

(54) MATERIALS HANDLING FACILITY PICK RATE ALLOCATION

(71) Applicant: Amazon Technologies, Inc., Seattle, WA (US)

(72) Inventors: Sebastian Lehmann, Seattle, WA (US); Udit Madan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 480 days.

(21) Appl. No.: 15/864,934

(22) Filed: Jan. 8, 2018

Related U.S. Application Data

(63) Continuation of application No. 14/089,296, filed on Nov. 25, 2013, now Pat. No. 9,864,962.

(51) Int. Cl.
*G06Q 10/06* (2012.01)

(52) U.S. Cl.
CPC .............................. *G06Q 10/06311* (2013.01)

(58) Field of Classification Search
CPC ............................................... G06Q 10/06311
See application file for complete search history.

(56) References Cited

U.S. PATENT DOCUMENTS

| | | | |
|---|---|---|---|
| 6,289,260 B1 | 9/2001 | Bradley et al. | |
| 7,426,484 B2 | 9/2008 | Joyce et al. | |
| 8,175,925 B1 | 5/2012 | Rouaix | |
| 8,396,585 B2* | 3/2013 | Antony | G06Q 10/087 700/216 |
| 8,407,108 B2 | 3/2013 | Foltz et al. | |
| 2002/0161618 A1 | 10/2002 | Weiss et al. | |
| 2002/0188499 A1 | 12/2002 | Jenkins et al. | |
| 2005/0015288 A1* | 1/2005 | Reeves | G06Q 10/06 705/7.13 |
| 2005/0137733 A1 | 6/2005 | Chao et al. | |
| 2008/0167884 A1 | 7/2008 | Mountz et al. | |
| 2009/0043631 A1* | 2/2009 | Finlayson | G06Q 10/06 705/7.17 |
| 2011/0295644 A1 | 12/2011 | Hara et al. | |

OTHER PUBLICATIONS

Gallego (Throughput, Work-in-Process, and Cycle Time) IEOR 4000: Production Management, Feb. 1, 2002 available at www.columbia.edu/-gmg2/4000/pdfold/throughput.pdf.

* cited by examiner

*Primary Examiner* — Folashade Anderson
(74) *Attorney, Agent, or Firm* — Athorus, PLLC

(57) ABSTRACT

A pick rate planning system is utilized to determine pick rates needed for the picking of items in a materials handling facility. Critical pull times ("CPTs") are determined which indicate times by which items must be picked from inventory. A picking capacity of the materials handling facility is determined and pick rates are allocated as corresponding to regions of the picking capacity that are associated with the CPTs. As part of the allocating of the pick rates, regions of the picking capacity may have portions that result in a level filling of the picking capacity that minimizes spikes and other undesirable fluctuations.

20 Claims, 10 Drawing Sheets

US 10,824,970 B1

MATERIALS HANDLING FACILITY PICK RATE ALLOCATION

CROSS-REFERENCE TO RELATED APPLICATIONS

This application is a continuation application of U.S. patent application Ser. No. 14/089,296, filed on Nov. 25, 2013, and entitled "Minimum Suggested Rate Picking," which is hereby incorporated herein by reference in its entirety.

BACKGROUND

Many companies package items and/or groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by clients or customers. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

To deliver these products to the customer, the operators of the materials handling facilities often coordinate with one or more carriers (e.g., Federal Express, U.S. Post Office, DHL, UPS) to retrieve the ordered items from the materials handling facility and transport them to the customers. The carriers often schedule departure times identifying when each truck or other transportation unit will depart the materials handling facility. To ensure that the ordered items are ready to be loaded into the truck or other transportation unit prior to the scheduled departure time, schedules may be set that indicate deadlines by which the items must be retrieved or "picked" from inventory and packed in preparation for shipment.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
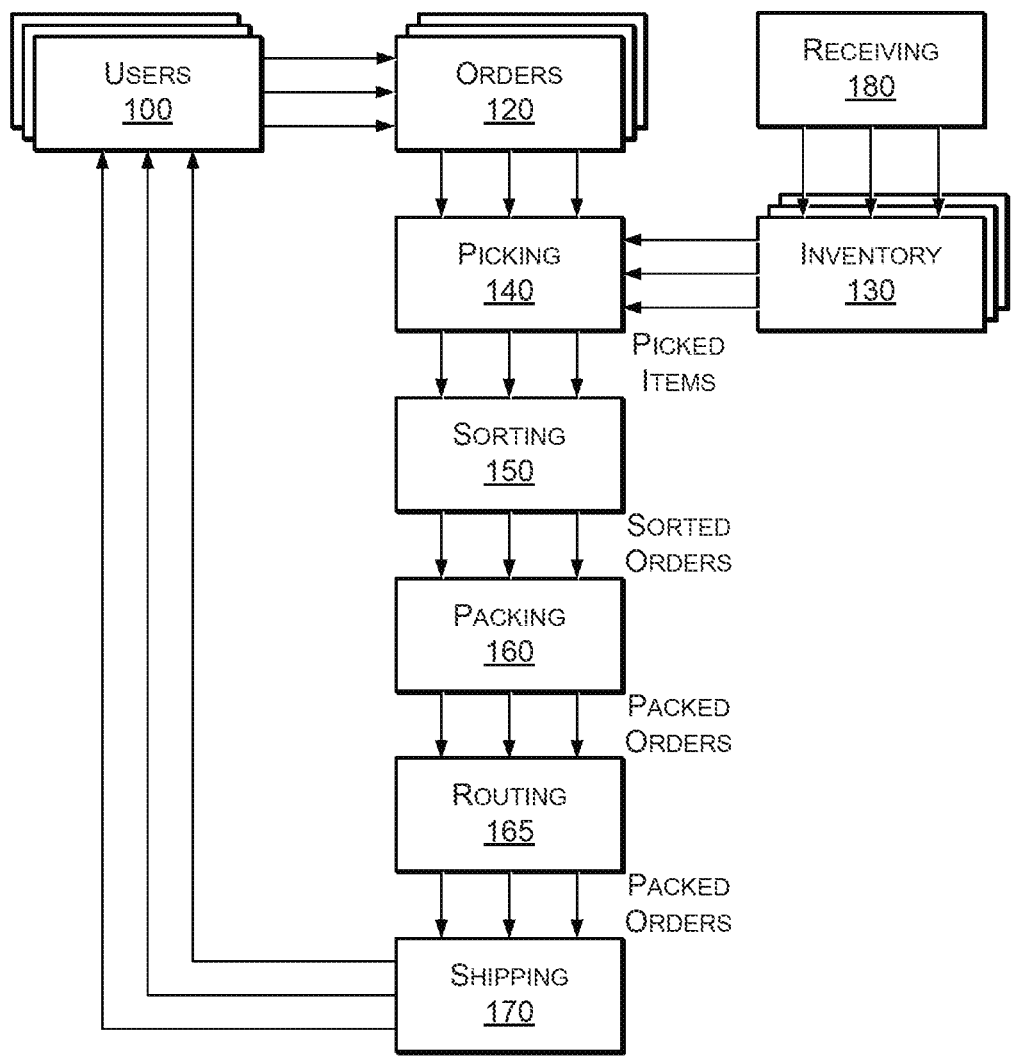
FIG. 1 illustrates a broad view of the operations of a materials handling facility, in one implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

A pick rate planning system may be part of a larger planning system that is configured to facilitate picking, packing, sorting and/or shipping operations and may include various components used to facilitate efficient and/or cost-effective operations in a materials handling facility. For example, one or more of these components may be utilized to determine pick rates needed for the picking of items such that they can be routed through the materials handling facility for other processing (e.g., packing) in order to arrive at an appropriate location in the materials handling facility in time for a selected carrier to retrieve the package and transport it to a destination (e.g., user selected destination).

To further illustrate, carriers often provide delivery schedules that identify estimated shipping times and costs for various shipping methods to transport an item from the materials handling facility to a destination. Likewise, when the carrier has a recurring departure of trucks, shipping containers, rail cars, etc. (generally referred to herein as "transportation units") from the materials handling facility, the carrier may pre-plan departure times for those transportation units from the materials handling facility. For an item to be included on a departing transportation unit it must often be picked by a specified time from inventory so that it can be routed through the materials handling facility for other processing and arrive at the transportation unit in time for the departure. The specified time by which the item must be picked from inventory is referred to herein as a critical pull time ("CPT").

When a pick rate is being planned for a CPT, it may be desirable to make the pick rate as constant as possible. For example, if 1,000 items are needed for a CPT of 12:00, and it is currently 2:00, it may be desirable to apply a constant pick rate of 100 items/hour over the next 10 hours. This approach avoids spikes or other undesirable variations in the pick rate, which is better for labor planning, etc. For example, a spike in a pick rate may require an inefficient addition or movement of labor as workers are required to be added or moved from other stations/tasks to help with the spike for a short period of time before no longer being needed or returning to their original stations/tasks.

Similarly, when multiple pick rates are being planned that overlap in time, it may be desirable to make the total combined pick rate as constant as possible. Returning to the above example of the 100 items/hour over the next 10 hours for the CPT of 12:00, if another 2,000 items are required for a CPT of 22:00, in order to make the overall pick rate as constant as possible (i.e., 150 items/hour over the entire 20 hours), the 2,000 items may be scheduled to be picked at a rate of 50 items/hour over the next 10 hours (which are added to the 100 items/hour for the CPT of 12:00), and at a rate of 150 items/hour over the final 10 hours.

It may also be desirable to provide various types of flexibility for the picking scheduler so as to increase the pick density and productivity. To provide greater flexibility, in one implementation, pick rates for a later CPT may designated as being for that CPT or any earlier CPTs, and all of the pick rates may be designated as minimum suggested pick rates. In the above example, the current pick rate of 50 items/hour for the CPT of 22:00 would thus be designated as being satisfied by picking for any earlier CPTs (i.e., the CPT of 12:00). If items for the CPT of 22:00 were not initially available (e.g., were coming but were still being processed by upstream systems), the 50 items/hour pick rate could be used initially to pick items for the CPT of 12:00, and then later the pick rates could be adjusted to allow for more picking for the CPT of 22:00. The end result would be that the total combined pick rate could be maintained at the constant level of 150 items/hour. This example also illustrates why the pick rates may be designated as minimum suggested pick rates, in that the initial pick rate of 100 items/hour for the CPT of 12:00 is a minimum suggested pick rate for which it is acceptable when the above described adjustment results in a higher actual pick rate at 150 items/hour.

While the CPT is generally discussed herein with respect to a time by which an item must be picked from inventory so that it can be routed through the materials handling facility and arrive at the transportation unit by the departure time, in some implementations, the CPT may alternatively represent a time by which an item must arrive at another location within the materials handling facility. For example, the CPT may alternatively be related to a time by which an item must be packed and arrive at a transportation unit for retrieval by a carrier. As another example, the CPT may alternatively be related to a time by which an item must be produced, such as for the production of books by an on-demand printing process.

For illustrative purposes, some examples of a pick rate planning system (and/or various components thereof) are discussed below in which various parameters are analyzed in particular manners, and in which one or more picking rates for a materials handling facility may be determined for a period of time. However, those skilled in the art will appreciate that the techniques described may be used in a wide variety of other situations, and that other implementations are not limited to the details of these examples.

A block diagram of a materials handling facility, which, in one implementation, may be an order fulfillment facility configured to utilize various systems and processes described herein, is illustrated in FIG. 1. In this example, multiple users 100 may submit orders 120, where each order 120 specifies one or more items from inventory 130 to be shipped to the user or to another entity specified in the order. An order fulfillment facility typically includes a receiving operation 180 for receiving shipments of stock from various vendors and storing the received stock in inventory 130. To fulfill the orders 120, the item(s) specified in each order may be retrieved or "picked" from inventory 130 (which may also be referred to as stock storage) in the order fulfillment facility, as indicated by picking operation 140. An item that has been assigned for shipment from the material handling facility but has not yet been retrieved (picked) from its inventory location is considered a "pre-picked" item. Items that have been retrieved from their inventory location but are not yet packed are considered "post-picked" items. Finally, items that have been retrieved and packed are considered "packed items." In some implementations, the items of a user order may be divided into multiple shipment sets for fulfillment by an order planning system before fulfillment instructions are generated (not shown).

In this example, picked items may be routed to one or more stations in the order fulfillment facility for sorting 150 into their respective shipment sets and for packing 160. The routing of items through a materials handling facility (e.g., routing from picking 140, to sorting 150, to packing 160, to shipping 170, or any combination thereof) is generally referred to herein as a "process path."

A package routing operation 165 may sort packed orders for routing to one of two or more shipping operations 170, from which they may be shipped to the users 100. The package routing operation 165 may in various implementations be automated or manual. The package routing operation 165 may receive an indication of the destination to which each packed order should be routed from a central control system and an identification of a transportation unit that is to be used to transport the packed order. Based on this information and information about the packed order, or items in the packed order, the order may progress through the materials handling facility via one or more process paths.

In some implementations, the routing operation may route the picked or sorted items to a particular packing station 160 depending upon the size or type of the packaging into which the items are to be packaged. This again may be considered part of the process paths that are used when moving items within the materials handling facility. For example, not all shipping packages utilized in the facility may be available at all of the packing stations 160. Similarly, some packing stations 160 may not have access to protective materials recommended for shipping fragile items or items for which additional protection may be appropriate. Therefore, if a shipment set requires special packaging, a routing operation may be configured to direct the item(s) to a packing station 160 at which an appropriate shipping package and/or protective materials are available. Likewise, if a fragile item is designated for packing into a delivery package or transfer package, it may be routed to a packing station (not shown) at which appropriate protective material or packaging is available to allow for proper handling of the item(s). As another example, if an item has been designated for gift wrapping (e.g., the user has selected to have the item gift wrapped), the item may be routed to a packing station that provides the operation of gift wrapping the item before it is packed.

In some implementations, items received at receiving 180 may not be stock inventory and may be processed and delivered to the package routing operation 165 for shipping 170 to the user 100. For example, receiving 180 may receive an item from a merchant that is to be delivered to a user 100. In another example, receiving 180 may receive items from another materials handling facility or another vendor destined for a user 100.

Note that not every fulfillment facility may include both sorting and packing stations. In certain implementations, agents may transfer picked items directly to a packing station, such as packing station 160, while in other implementations, agents may transfer picked items to a combination of sorting and packing stations (not illustrated). This may result in a stream and/or batches of picked items for multiple incomplete or complete shipment sets being delivered to a sorting station for sorting 150 into their respective shipment sets for packing and shipping, according to one implementation.

Portions of a shipment set may be received at different times or during different time intervals. When portions of a shipment set do not arrive during the same time interval, sorting 150 and packing 160 may have to wait for one or more items of some shipment sets to be delivered to the sorting station(s) before processing of the shipment set can be completed. Note that a picked, packed and shipped shipment set does not necessarily include all of the items ordered by the user; a shipped shipment set may include only a subset of the ordered items available to ship at one time from one materials handling facility. Also note that the various operations of a materials handling facility may be located in one building or facility, or alternatively may be spread or subdivided across two or more buildings or facilities.

As used herein, an "item" may be any individual physical item or a group of items that are handled as a single unit. For example, a pallet of packages that is being treated as a single item for routing through a materials handling facility and/or for which a CPT is associated, may be considered an item as utilized in the present disclosure. As another example, an "item" also includes a single package, tote, bin and/or other container in which one or more items are placed/stored for handling as a group.

The arrangement and order of operations illustrated by FIG. 1 is merely one example of many possible implementations of the operation of a materials handling facility, such as an order fulfillment facility. Other types of materials handling, manufacturing, or order fulfillment facilities may include different, fewer, or additional operations and resources, according to different implementations.

Each of the operations of picking 140, sorting 150, packing 160 and routing 165 take time and must be factored into determining the needed picking and packing rates to ensure items arrive at the selected transportation unit or other location within the materials handling facility before the designated departure time. For the picking rates, CPTs may be established by which the picking must be completed for a given set of units in order to have enough time to complete the remaining operations. Depending on the available picking capacity, the picking of items for earlier CPTs may sometimes be prioritized over the picking of items for later CPTs. As will be described in more detail below, the picking scheduler may evaluate the total available picking capacity and determine minimum suggested pick rates for each CPT that will allow each of the processes to be completed on time.

Figure 2:
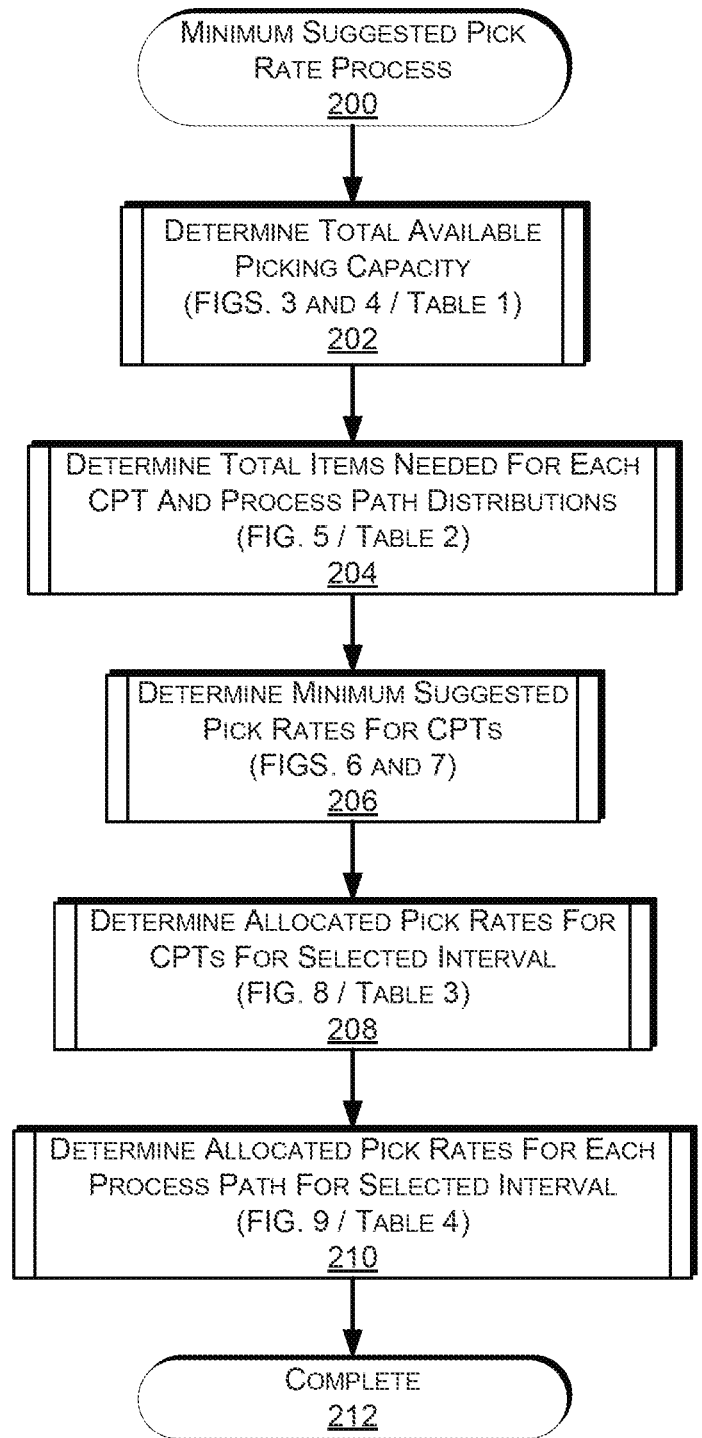
FIG. 2 is a flow diagram illustrating an example process for determining minimum suggested pick rates at a materials handling facility, according to an implementation.

For example, FIG. 2 is a flow diagram illustrating an example process 200 for determining minimum suggested pick rates, according to an implementation. The process and each of the other processes and sub-processes discussed herein are illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

Figure 3:
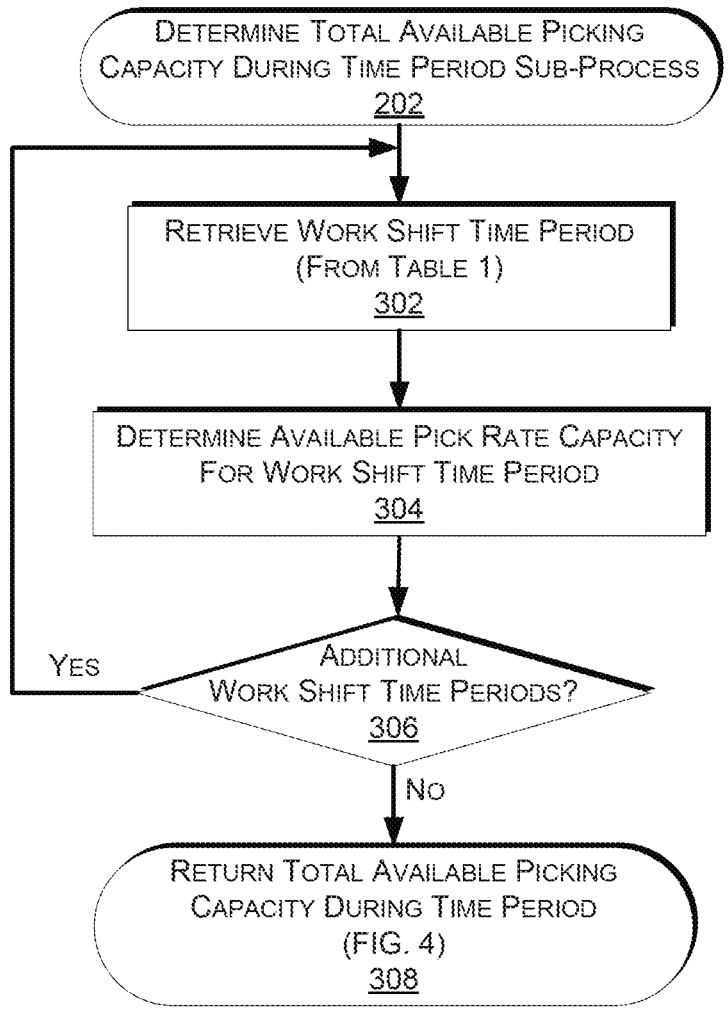
FIG. 3 is a flow diagram illustrating an example sub-process for determining a total available picking capacity during a time period, according to an implementation.

The example process 200 begins by determining a total available picking capacity during a time period, as in sub-process 202. Turning to FIG. 3, the sub-process 202 may retrieve a work shift time period, as in 302. For example, referring to Table 1 below, work shift time periods are indicated, including a first work shift time period which has a start time of 0:15 and an end time of 2:15.

TABLE 1

| Start | End | Shift | Tuesday | Wednesday | Thursday |
|---|---|---|---|---|---|
| 0:15 | 2:15 | night shift | 5,000 | 5,000 | 4,000 |
| 2:30 | 5:00 | night shift | 5,000 | 5,000 | 4,000 |
| 7:30 | 9:45 | day shift | 8,000 | 8,000 | 8,000 |
| 10:00 | 11:45 | day shift | 8,000 | 8,000 | 8,000 |
| 12:15 | 14:15 | day shift | 8,000 | 8,000 | 8,000 |
| 14:30 | 17:00 | day shift | 8,000 | 8,000 | 8,000 |
| 19:30 | 21:45 | night shift | 5,000 | 4,000 | 5,000 |
| 22:00 | 23:45 | night shift | 5,000 | 4,000 | 5,000 |

Once the work shift time period has been retrieved, an available pick rate capacity for the work shift time period may be determined, as in 304. Each of the pick rate capacities that are indicated in Table 1 and described below are planned in 0.25 hour increments. For example, during the day shift the time periods on certain days (e.g. on Tuesday, Wednesday and Thursday) may have a pick rate capacity of 8,000 items/0.25 hour (i.e., 32,000 items/hour), and during the night shift the time periods on certain days (e.g. on Tuesday) may have a pick rate capacity of 5,000 items/0.25 hour (i.e., 20,000 items/hour). On different days, different pick rate capacities may be indicated. For example, during the night shift at the end of Wednesday and at the beginning of Thursday, it may be known that 20% of the workforce will be on leave, for which the pick rate capacity may be reduced to 4,000 items/0.25 hour. In various implementations, the pick rates may also incorporate additional data. For example, data from recent changes, such as a worker not arriving for their shift, may be accounted for to reduce the available pick rate for the associated time period.

Once the pick rate capacity for the work shift time period is determined, a determination is made as to whether there are any additional work shift time periods during the overall time period, as in 306. If additional work shift time periods remain, the example process returns to block 302 and continues by retrieving the next work shift time period in a similar manner. However, if it is determined that all of the work shift time periods for the overall time period have been processed, the example sub-process 202 completes and returns the total available picking capacity for the work shift time periods during the overall time period, as in 308.

Figure 4:
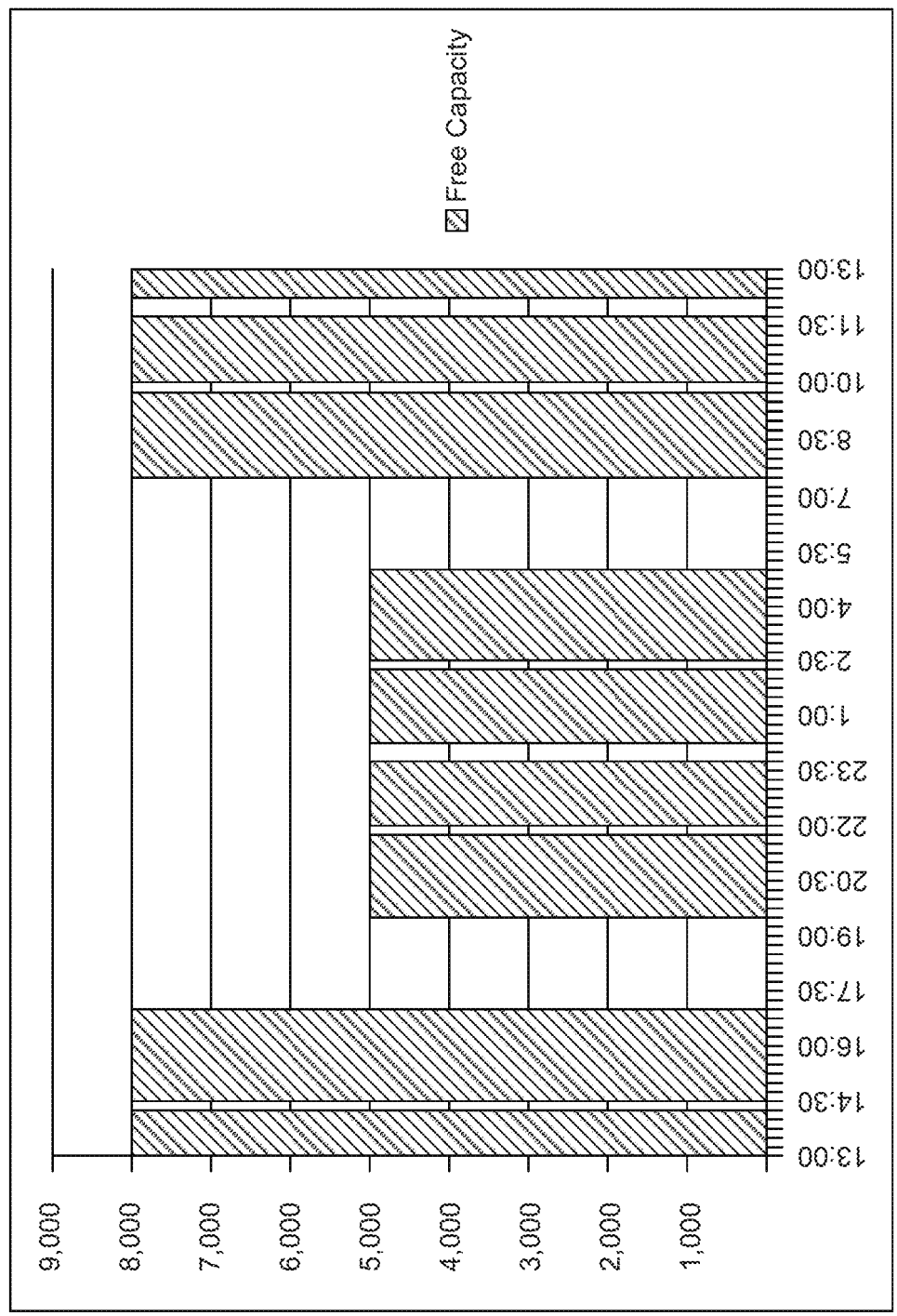
FIG. 4 is a diagram of a graph illustrating a total available picking capacity during a time period as determined by the example sub-process of FIG. 3, according to an implementation.

FIG. 4 is a diagram of a graph illustrating a total available picking capacity over a 24-hour time period as determined by the example sub-process of FIG. 3. The 24-hour time period of FIG. 4 begins and ends at a time of 13:00 on respective days. In one implementation, the time of 13:00 may represent a current or otherwise selected time interval on Tuesday for which the picking capacity is being planned over the subsequent 24 hours until the time of 13:00 on Wednesday. Returning to the example of the work shift time period of Table 1 with an end time of 14:15, in FIG. 4 a corresponding first capacity region with an end time of 14:15 is shown, which has a height indicative of the day shift pick rate capacity of 8,000 items/0.25 hour. Similarly, for the next work shift time period of Table 1, in FIG. 4 the time period is represented as a second capacity region with a start time of 14:30 and an end time of 17:00, with a height indicative of the corresponding day shift pick rate capacity of 8,000 items/0.25 hour. A 15 minute break time is indicated as a space between the first and second capacity regions, from the time of 14:15 to 14:30. A 1.5 hour break is also indicated between the end of the second capacity region which correspondingly represents the end of the day shift at the time of 17:00, and the start of a third capacity region which correspondingly represents the start of the night shift at the time of 19:30.

As illustrated in FIG. 4, the total night shift is represented by third, fourth, fifth and sixth capacity regions, all with heights indicating the night shift pick rate capacity of 5,000 items/0.25 hour. Three breaks occur between the third, fourth, fifth and sixth capacity regions, from the times of 21:45 to 22:00, 23:45 to 0:15 and 2:15 to 2:30. Following the sixth capacity region, which is representative of the final work shift time period of the night shift ending at the time of 5:00, a 2.5 hour break is again shown until the start of the seventh capacity region which represents the start of the next day shift at the time of 7:30. The seventh, eighth and ninth capacity regions represent the portions of the day shift until the end of the 24-hour graph at the time of 13:00, and have heights indicative of the day shift pick rate capacity of 8,000 items/0.25 hour. In summary, the capacity regions of the graph of FIG. 4 are representative of the total available picking capacity during the 24 hour time period. As will be described in more detail below with respect to FIG. 7, various planning techniques may be utilized to associate minimum suggested pick rates for CPTs with the capacity regions of the graph of FIG. 4.

Figure 5:
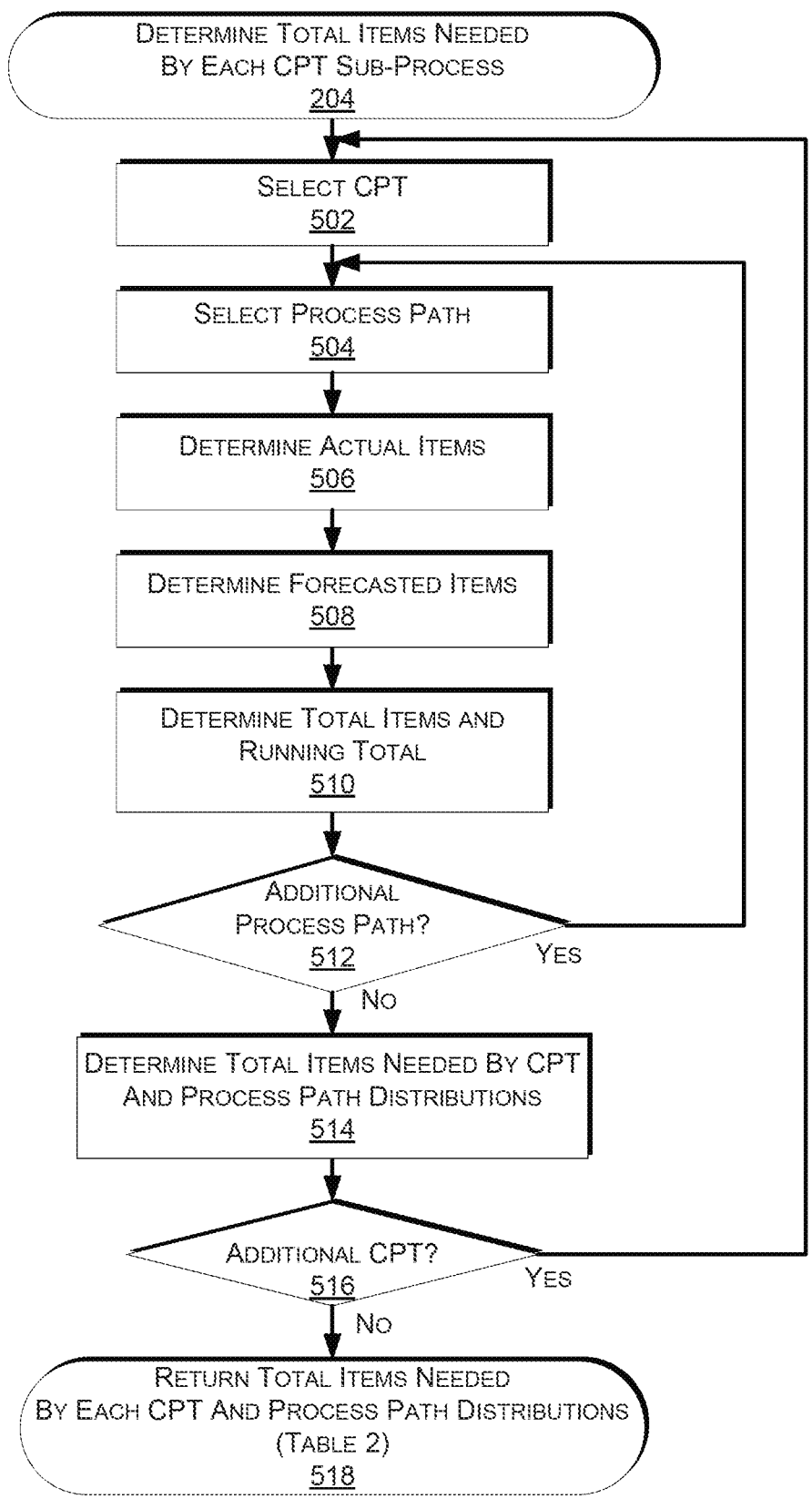
FIG. 5 is a flow diagram illustrating an example sub-process for determining a total number of items needed by critical pull times, according to an implementation.

Returning again to FIG. 2, once the total available picking capacity during the overall time period has been determined, a total number of items needed by each CPT and associated process path distributions are determined, as in sub-process 204. Sub-process 204 is discussed with respect to FIG. 5 and Table 2 below.

TABLE 2

| | Actual Items | | Forecasted Items | | Total Items | | Total | Running Total | | PP Distribution | |
|---|---|---|---|---|---|---|---|---|---|---|---|
| CPT | PP1 | PP2 | PP1 | PP2 | PP1 | PP2 | CPT | PP1 | PP2 | PP1 | PP2 |
| 20:45 | 15000 | 30000 | 5000 | 10000 | 20000 | 40000 | 60000 | 20000 | 40000 | 33.3% | 66.7% |
| 23:00 | 9000 | 18000 | 8500 | 16500 | 17500 | 34500 | 52000 | 37500 | 74500 | 33.5% | 66.5% |
| 01:15 | 10000 | 20000 | 16000 | 32000 | 26000 | 52000 | 78000 | 63500 | 126500 | 33.4% | 66.6% |
| 08:45 | 5000 | 10000 | 14000 | 28000 | 19000 | 38000 | 57000 | 82500 | 164500 | 33.4% | 66.6% |
| 10:30 | 3000 | 6000 | 11000 | 23000 | 14000 | 29000 | 43000 | 96500 | 193500 | 33.3% | 66.7% |
| 12:00 | 2500 | 5000 | 14000 | 28500 | 16500 | 33500 | 50000 | 113000 | 227000 | 33.2% | 66.8% |
| 13:15 | 3500 | 7000 | 33000 | 66500 | 36500 | 73500 | 110000 | 149500 | 300500 | 33.2% | 66.8% |

Sub-process 204 begins by selecting a CPT, as in 502, and selecting a process path for which items may be routed for the CPT, as in 504. For example, referring to Table 2, which represents an allocation matrix, in the first row for the CPT of 20:45, it is indicated that there is at least a first process path PP1 through which items may be routed for that CPT. For the process path, a number of actual items may be determined, as in 506, a number of forecasted items may be determined, as in 508, and a total number of items and a running total may be determined, as in 510. For example, referring to Table 2, the number of actual items, number of forecasted items, total number of items and running total number of items for the CPT of 20:45 for the first process path PP1 are indicated to be 15,000, 5,000, 20,000 and 20,000, respectively. The total items are determined by adding the actual items to the forecasted items, and the running total is determined by adding the current total items to any prior total items of any prior CPTs.

Once a total number of items and a running total for the process path and CPT combination have been determined, it may be determined whether additional process paths for the CPT remain, as in 512. If it is determined that additional process paths for the CPT remain, the example sub-process returns to 504 and continues by selecting the next process path for the CPT. For example, referring to Table 2, it is indicated that there is a second process path PP2 through which items may be routed for the CPT. If at decision block 512 it is determined that no process paths remain for the CPT, a total of the items needed by the CPT and the allocated percentages of the process path distributions may be determined, as in 514. For example, referring to Table 2, in the first row for the CPT of 20:45, the total items needed by the CPT is indicated to be 60,000, and the process path distributions are indicated to be 33% for the first process path PP1, and 66.7% for the second process path PP2.

The total number of items for the CPT is determined by adding the total items for each of the process paths for the CPT (e.g., for the CPT of 20:45, the total items for the first process path PP1 of 20,000 are added to the total items for the second process path PP2 of 40,000 to equal the total items for the CPT of 60,000). These amounts also determine the process path distribution percentages, which are determined according to the ratio of the total items for each of the process paths to the total items for the CPT (e.g., the total items for the first process path PP1 of 20,000 divided by the total items for the CPT of 60,000 equals 33.3%). In various implementations, the process path distribution percentages may differ by varying amounts between different CPTs. For example, as indicated in Table 2 while the process path distribution percentage for PP1 for the CPT of 20:45 is 33.3%, for the CPT of 23:00 it is 33.5%. Furthermore, while the process path distribution percentages in Table 2 are indicated as varying by relatively small amounts for the different CPTs, in other implementations the percentages may vary more significantly.

After the total number of items needed by the CPT and the percentages for the process path distributions are determined, it may be determined if any CPTs remain, as in 516. If any CPTs remain that have not yet been processed, the example sub-process 204 returns to block 502 and continues by selecting the next CPT. Once the total items needed for each CPT and percentages for the process path distributions have been determined for each process path and CPT combination, the example sub-process 204 may return the resulting matrix, as in 518. As described above, Table 2 may include a representation of the resulting matrix.

Returning again to FIG. 2, once the total number of items needed by each CPT and percentages of the process path distributions have been determined, minimum suggested pick rates associated with CPTs may be determined, as in sub-process 206. Sub-process 206 is discussed with respect to FIGS. 6 and 7 below. Sub-process 206 begins by retrieving the total available picking capacity for the time periods of the CPTs (e.g., from FIG. 4), as in 602. Once the total available picking capacity has been retrieved, a first/next CPT may be selected, as in 604, and the total items needed for the CPT may be retrieved, as in 606. For example, referring to Table 2, the total items needed for the first CPT of 20:45 is indicated to be 60,000. Once the total items that are needed are retrieved, the available picking capacity remaining after allocations to prior CPTs is determined, as in 608. As will be described in more detail below with respect to FIG. 7, as the minimum suggested pick rates are allocated for each CPT, the minimum suggested pick rates for the remaining CPTs may be based at least in part on the amount of picking capacity that remains after the allocations to the prior CPTs. Once the remaining available picking capacity has been determined, minimum suggested pick rate(s) for the time period of the CPT are determined, as in 610. Examples of minimum suggested pick rates will be described in more detail below with respect to FIG. 7.

Once the minimum suggested pick rate(s) for the time period of the CPT have been determined, a determination may be made as to whether any CPTs remain, as in 612. If any CPTs remain that have not yet been processed, the example sub-process 206 may return to 604 and continue by selecting the next CPT. Once the minimum suggested pick rates have been determined for all of the CPTs in order, the example sub-process may return the minimum suggested pick rates, as in 614.

Figure 6:
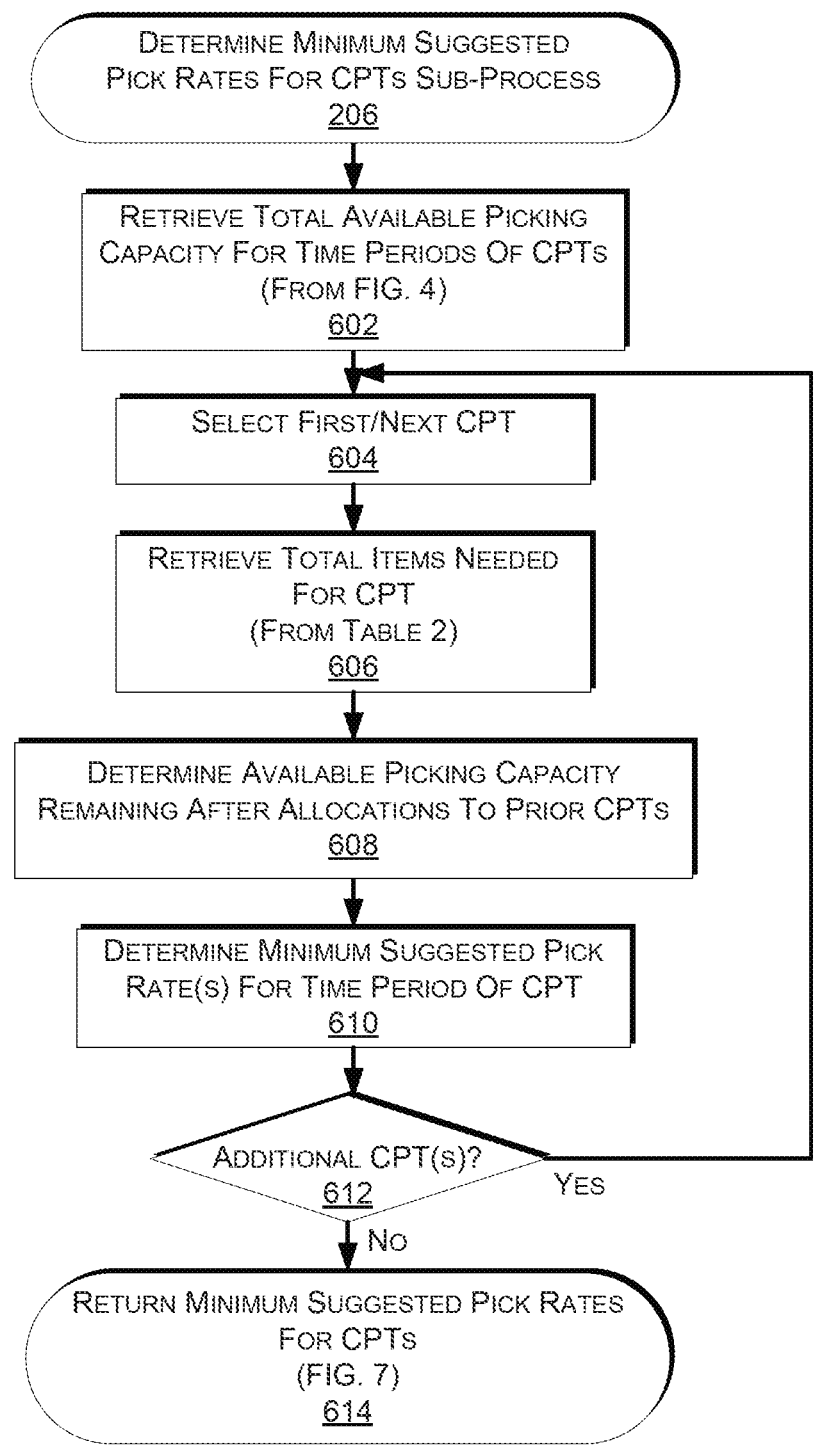
FIG. 6 is a flow diagram illustrating an example sub-process for determining minimum suggested pick rates as associated with critical pull times, according to an implementation.
Figure 7:
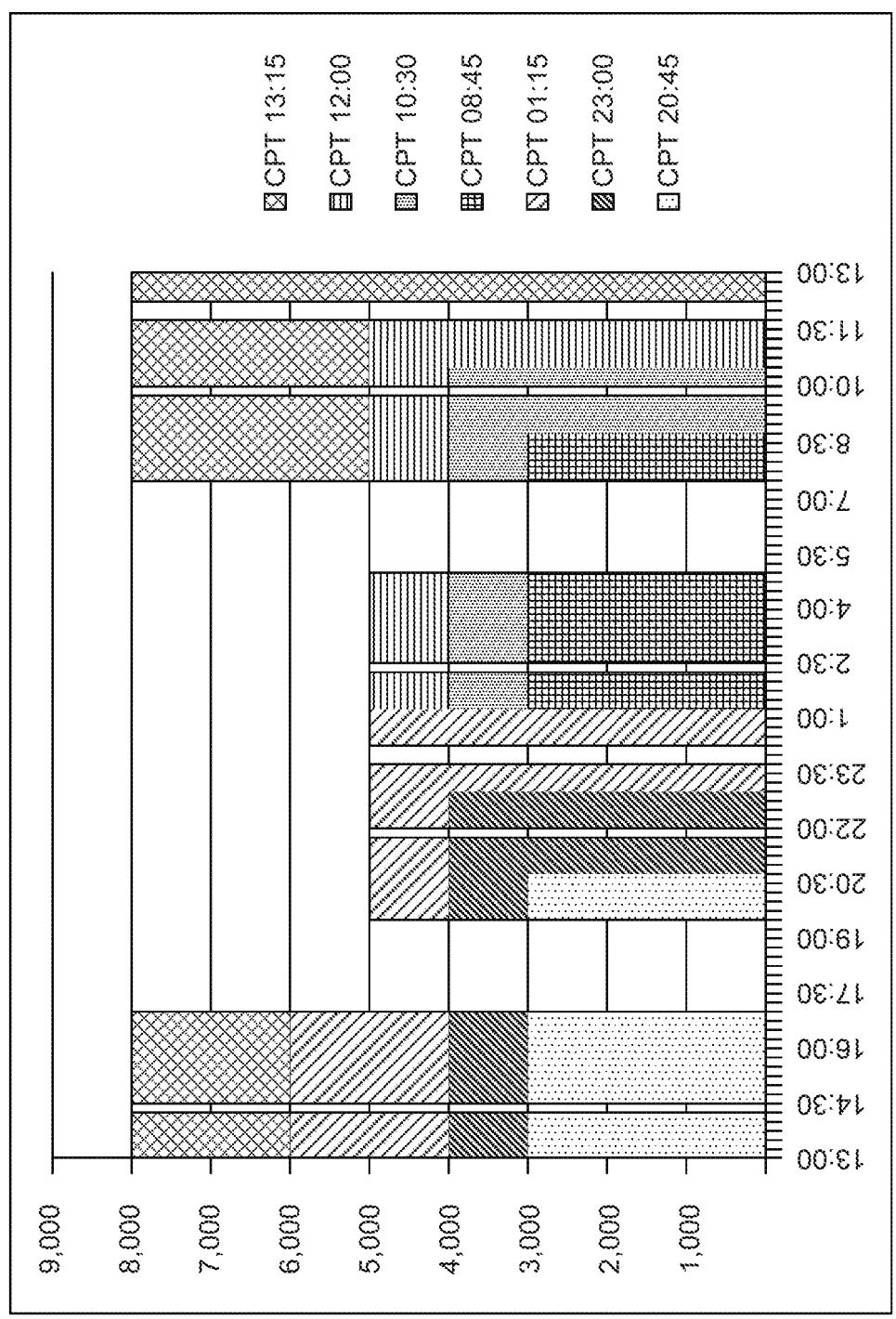
FIG. 7 is a diagram of a graph illustrating a schedule of minimum suggested pick rates during a time period as determined by the example sub-process of FIG. 6, according to an implementation.

FIG. 7 is a diagram of a graph illustrating a schedule of minimum suggested pick rates during a time period as determined by the example sub-process 206 of FIG. 6 and as applied to the pick rate capacity graph of FIG. 4. Returning to the example of the first CPT of 20:45, the total items needed are 60,000 (from Table 2). Starting from the beginning of the graph in FIG. 7 at the time of 13:00, 5 hours of work shift time periods are represented until the CPT of 20:45 (i.e., 13:00-14:15, 14:30-17:00 and 19:30-20:45), which equate to 20 scheduling increments of 0.25 hours. To achieve the 60,000 items that need to be picked, a minimum suggested pick rate of 3,000/0.25 hour is allocated to the CPT of 20:45. This allocated pick rate is represented as a first picking region between the times of 13:00 and 20:45, which has a height corresponding to the 3,000 items/0.25 hour pick rate. As a result, for the current time increment from 13:00-13:15, the picking scheduler will instruct the picking of 3,000 items for the CPT of 20:45.

In various implementations, a utilization of relatively constant pick rates may be preferable over other methods (e.g., utilizing increasing or decreasing or discrete pick rates, etc.). By utilizing relatively constant pick rates when available, the maximum required pick rate over the interval is minimized, and spikes or other undesirable changes in the pick rates are reduced. Such fluctuations in the pick rate are undesirable in that they may increase the costs and complexity of the picking process. For example, a scheduled spike in the picking process may require some or all of the workers on a shift to stop their current tasks and go pick items for the scheduled spike, before returning to other stations or other picking activities and/or may require the short-term addition/removal of other workers to/from the shift. Such movements are less efficient than having a more distributed schedule of picking which can have an allocated number of workers over a longer period of time.

Turning to the next CPT of 23:00, a second picking region between the times of 13:00 and 23:00 is represented as having a height corresponding to a combined 4,000 items/0.25 hour pick rate for the first and second picking regions. The second picking region includes a first portion between the times of 20:45 and 23:00 (i.e., between the end of the first CPT of 20:45 and the end of the current second CPT of 23:00), up to the 3,000 items/0.25 hour pick rate which equals the height of the first picking region. This first portion of the second picking region equates to a picking of 24,000 items (i.e., two hours of work shifts multiplied by the pick rate of 3,000 items/0.25 hour). Since the CPT of 23:00 requires 52,000 items (from Table 2), an additional 28,000 items are needed. These items are provided by the top portion of the second picking region, between the times of 13:00 and 23:00 (i.e., 1,000 items/0.25 hour pick rate times seven hours of work shifts equals 28,000 items). These first and second portions of the second picking region may be compared to "filling" a similarly shaped container with water, in which the prior first picking region for the CPT of 20:45 has been frozen, and the lower first portion of the second picking region fills up first and the higher second portion fills up after. The end result is an even distribution and a constant total combined pick rate which achieves the goal of minimizing spikes and other undesirable fluctuations. More specifically, over the total time period from 13:00 until the CPT of 23:00, of the 112,000 items that need to be picked (i.e., 60,000 items for the CPT of 20:45 and 52,000 items for the CPT of 23:00), the total picking rate of 4,000 items/0.25 hour over the available seven hours (i.e., 28 work shift increments of 0.25 hours), is a constant total combined pick rate which results in the required number of items for both of the CPTs of 20:45 and 23:00.

For the current 0.25 hour increment of 13:00-13:15, the picking scheduler may be required to pick 1,000 items for the CPT of 23:00, or alternatively may be allowed to pick 1,000 items for the CPT of 23:00 or any prior CPTs (i.e., the items could also be picked for the CPT of 20:45). This latter approach results in increased flexibility for the picking scheduler and a higher pick density and productivity. For example, in an edge case where there are no items currently available for picking for the CPT of 23:00 (i.e., the items are still being processed by upstream systems), the picking scheduler will have the flexibility to pick more items for the CPT of 20:45. This example also illustrates why the pick rates are designated as minimum suggested pick rates, in that the initial pick rate of 3,000 items for the CPT of 20:45 is a minimum suggested pick rate for which it is acceptable when the above described adjustment results in a higher actual pick rate for the current 0.25 hour increment.

With respect to the third CPT of 01:15, a third picking region is indicated between the times of 13:00 and 01:15, with total combined pick rate for the first, second and third picking regions indicated by a height of 6,000 items/0.25 hour over the day shift work periods from the times of 13:00 to 17:00 and a height of 5,000 items/0.25 hour during the night shift work periods from the times of 19:30 to 01:15. The third picking region includes a first portion between the times of 23:00 and 01:15, with a height of 4,000 items/0.25 hours, which equates to 28,000 items. Since the CPT of 01:15 requires 78,000 items (from Table 2), an additional 50,000 items are also needed. A second portion of the third picking region is between the times of 13:00 and 01:15, and between the heights of 4,000 and 5,000 items/0.25 hours, which equates to an additional 35,000 items, leaving an additional 15,000 items that are needed for the CPT of 01:15. The picking for these final items is indicated in a third portion of the third picking region between the times of 13:00 and 17:00, and between the heights of 5,000 and 6,000 items/0.25 hour, which results in the remaining 15,000 items. As noted above, these first, second and third portions result in a level "filling" of the third picking regions which has a resulting level distribution of the total combined pick rates for the first, second and third picking regions that avoid spikes and other undesirable fluctuations. Similar to the first and second picking regions, the minimum suggested pick rates of this third picking region are also designated as being for the CPT of 01:15, or any prior CPTs (i.e., the CPTs of 23:00 and 20:45). As noted above, this technique provides the picking scheduler with greater flexibility that results in a higher pick density and productivity.

The third picking region also illustrates an occurrence of a capacity constrained condition for the night shift, and a utilization of the available picking capacity during another work shift (i.e., the prior day shift) for picking ahead for the needed items. As described above, the first and second portions of the third picking region have an upper boundary pick rate of 5,000 items/0.25 hours, which corresponds to the total available picking capacity for the night shift during the hours beginning at 19:30. After this picking capacity for the night shift has been reached, the system is able to plan to utilize the available extra picking capacity during the day shift (i.e., during the third portion of the third picking region between the times of 13:00 and 17:00, and between the heights of 5,000 and 6,000 items/0.25 hour), for picking ahead for the remaining 15,000 items that are needed. It will be appreciated that the ability of the system to plan for shifting the needed picking to either prior or subsequent work shifts in this manner is particularly beneficial with respect to planning for capacity constrained conditions that may occur, such as that illustrated for the night shift in the third picking region.

With regard to the CPT of 08:45, a corresponding fourth picking region is shown between the times of 01:15 and 08:45, with a height of 3,000 units/0.25 hour. Unlike the second and third picking regions, the fourth picking region does not "overflow" above the prior picking regions, due to the fact that the entire 57,000 items needed for the CPT of 08:45 (from Table 2), can be accommodated in the portion between the end of the prior CPT of 01:15 and the current CPT of 08:45. The fourth picking region is again designated as allowing picking for the current CPT of 08:45, or any prior CPTs, although because the prior CPTs are scheduled to have completed before the start of the fourth picking region, barring additional changes or unexpected complications the fourth picking region may only correspond to picking items for the CPT of 08:45.

The fifth and sixth picking regions for the CPTs of 10:30 and 12:00, respectively, are scheduled in a similar manner as the second and third picking regions, described above. A seventh picking region, corresponding to the CPT of 13:15, is shown to include scheduling for the remaining available picking capacity of the graph of FIG. 7. Similar to the other picking regions described above, the seventh picking region is designated as allowing picking for the CPT of 13:15, or any prior CPTs. For example, during the current interval of 13:00-13:15 it will be acceptable for the picking rate of 2,000 items/0.25 hour that is allocated in the seventh picking region to be utilized to pick 2,000 items for the CPT of 13:15 or any of the prior CPTs. Thus, while picking rates for the current interval of 13:00-13:15 do not explicitly include picking rates for the CPTs of 8:45, 10:30 or 12:00, they may be considered to be included in the picking rate indicated in the seventh picking region for the CPT of 13:15.

The seventh picking region corresponding to the CPT of 13:15 also illustrates a capacity constrained condition. A capacity constrained condition occurs when the current interval (i.e. 13:00-13:15) is completely scheduled and has no further available picking capacity. In such a capacity constrained condition, a latest pickable CPT designation may be set for the final CPT that is causing the capacity constrained condition (i.e., the CPT of 13:15). With the latest pickable CPT designation set for the CPT of 13:15, even if changes occur wherein additional capacity becomes available (e.g., if pickers are working faster than usual), the picking scheduler may be advised to not pick anything for later CPTs until the latest pickable CPT designation has been lifted. In various implementations, if capacity constraints exist for future intervals, but not the current interval, a latest pickable CPT designation may not be set. In addition, in various implementations, once a capacity constrained condition is set, any further pick rate planning may be stopped, due to the fact that any planning for future CPTs will not influence what is done by the picking scheduler in the current interval. Once the capacity constrained condition has passed, a latest pickable CPT designation may be removed, and the pick rate planning may again be initiated.

In various implementations, the capacity constrained condition for the current interval may in some instances also require other corrective measures, such as when there is no space left in which to schedule the needed pick rates for an existing CPT. In various implementations, the corrective measures may include upgrading some demand to a later CPT and/or calling in overtime so as to increase the available picking capacity. For the calling in of overtime, a determination may be made of when and how much overtime may be needed in accordance with an analysis of the graph of FIG. 7 and/or other utilization of the above described techniques.

When a capacity constrained condition is not reached for the current interval, planning may continue to be made for further out CPTs. However, in certain implementations, the planning may be halted at various points. For example, planning may be stopped for forecasted items when they are further out than actual materialized items (i.e., items that can be acted upon right now). When the last actual materialized item is reached and the current capacity limit is still not filled, the scheduler may be allowed to pick any items utilizing the excess capacity. Alternatively, the extra capacity may be mitigated by shifting workers to other processes, calling for voluntary time off of the work force, etc. The present techniques may thus also be utilized to assist with evaluating when and how much shifting of the workforce, voluntary time off, etc. may be needed.

In one implementation, a pick rate for a CPT may only be enforced if it is at least a minimum percentage of the total picking capacity. As an example, if the minimum percentage was designated as 25%, for the current time interval of 13:00-13:15 in FIG. 7, the minimum suggested pick rate for the second picking region (i.e., corresponding to the CPT of 23:00) would not be enforced due to being only 12.5% of the total pick rate capacity, and would thus instead be included into the third picking region for the CPT of 01:15 (which as noted above would be for the CPT of 01:15 or any prior CPTs, including the CPTs of 23:00 and 20:45). As noted above, the planning may be reevaluated regularly (e.g., every 0.25 hour, every hour, etc.), and if the picking for the CPT of 23:00 began to fall behind, once it rose above the 25% threshold of the total picking capacity, it would again be enforced. It will be noted that during the night shift beginning at 19:30, the total picking capacity is reduced, and thus the 25% threshold becomes only 1,250 items, as compared to the 2,000 items threshold that existed during the day shift time periods. In various implementations, this minimum percentage threshold technique may be utilized to increase efficiency, in that it may be less efficient to allocate a constant labor pool and other resources to a relatively small batch of items being picked for the current interval.

In various implementations, rather than structuring the planning so as to achieve a constant pick rate level across all of the work shifts (e.g., day shifts and night shifts), techniques may be utilized to achieve a constant percentage of the labor pool for each type of work shift. For example, with respect to the first picking region corresponding to the CPT of 20:45, during the night shift which begins at 19:30, the picking rate may be reduced so as to be the same percentage of the overall labor force that was utilized during the day shift prior to the time of 17:00. The reduction in the allocated picking rate during the night shift would result in a needed increase in the allocated picking rate during the day shift until an equal percentage of the overall labor pool during each of the shifts was achieved. In such an implementation, similar adjustments would also be made for the remaining CPTs. Utilization of such techniques may result in a more efficient allocation of tasks between the labor pools. With regard to the specific example of FIG. 7, utilization of such techniques would also result in the seventh picking region for the CPT of 13:15 being distributed over both the day and night shifts, as opposed to just the day shift as is indicated in the current representation. This better distribution of the most flexible seventh picking region (i.e. being for the CPT of 13:15 or any prior CPTs) would result in greater flexibility for the picking scheduler and increased ability to address any unexpected changes during the night shift in particular.

Figure 8:
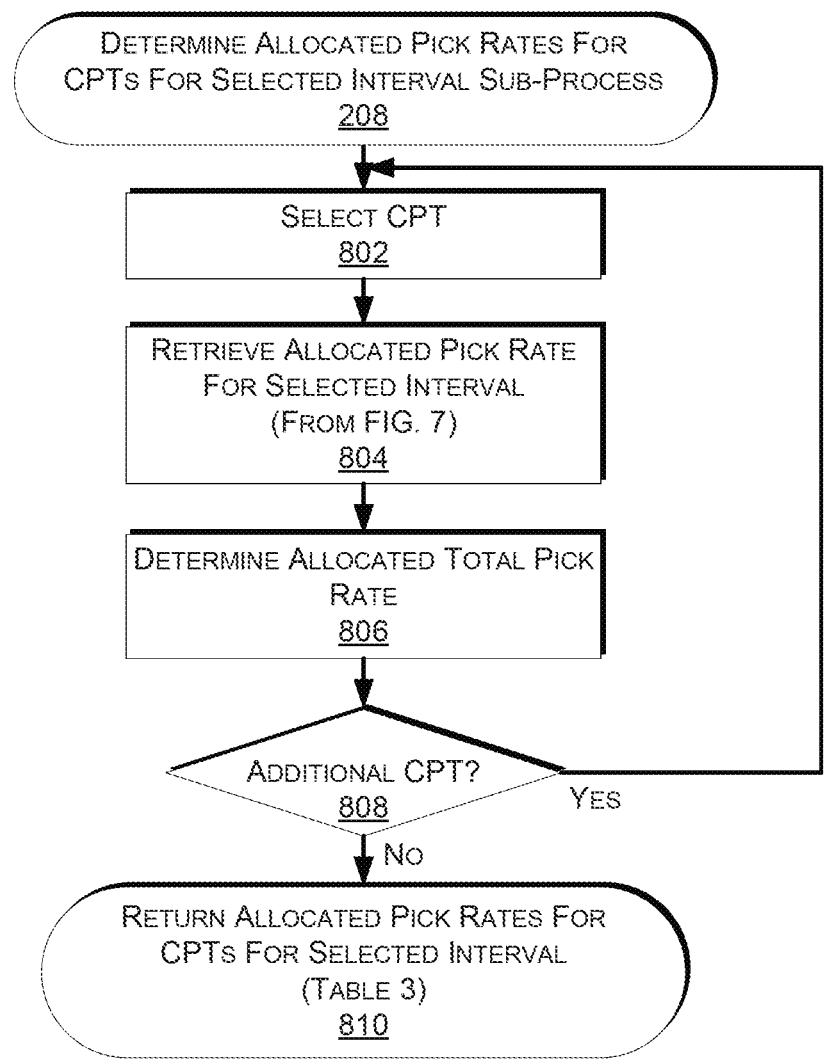
FIG. 8 is a flow diagram illustrating an example sub-process for determining allocated pick rates associated with critical pull times for a current interval, according to an implementation.

Returning again to FIG. 2, once the minimum suggested pick rates have been determined, a determination of allocated minimum suggested pick rates associated with CPTs for a selected interval is made, as in sub-process 208. Sub-process 208 is discussed with respect to FIG. 8 and Table 3 below. Sub-process 208 begins by selecting a CPT, as in 802, and retrieving an allocated pick rate for the selected interval, as in 804. For example, referring to FIG. 7, if the selected interval is assumed to be the current interval of 13:00-13:15, for the first CPT of 20:45 the allocated pick rate is 3,000 items/0.25 hour. Once the allocated pick rate for the selected interval has been retrieved, the allocated total pick rate is determined, as in 806. The allocated total pick rate may include the selected allocated rate as added to any previous allocated rates for any prior CPTs. For example, for the first CPT of 20:45, since there are no prior CPTs, the allocated total pick rate is simply the allocated pick rate of 3,000 items/0.25 hour. Once the allocated total pick rate has been determined, a determination is made as to whether any additional CPTs remain, as in 808. If any additional CPTs remain, the example sub-process returns to 802 where the next CPT is selected. Once the allocated pick rate for the selected interval has been retrieved and the allocated total pick rate has been determined for each of the CPTs, the example sub-process may return the allocated pick rates for the CPTs for the selected interval, as in 810. The following Table 3 illustrates an example representation of the allocated pick rates for the CPTs.

TABLE 3

| CPT | Allocated Rate | Allocated total rate |
| --- | --- | --- |
| 20:45 | 3000 | 3000 |
| 23:00 | 1000 | 4000 |
| 01:15 | 2000 | 6000 |
| 08:45 | #N/A | #N/A |
| 10:30 | #N/A | #N/A |
| 12:00 | #N/A | #N/A |
| 13:15 | 2000 | 8000 |

With reference to Table 3, the allocated pick rates per 0.25 hour for the CPTs of 20:45, 23:00 and 01:15 are 3,000 items, 1,000 items and 2,000 items, respectively, as are indicated for the selected interval of 13:00-13:15 in FIG. 7. The final available pick rate of 2,000 items is allocated to the CPT of 13:15. As described above, since each of the allocated minimum suggested pick rates is designated as being satisfied by picking for the designated CPT or any prior CPTs, while rates are not explicitly allocated for the CPTs of 8:45, 10:30 or 12:00, in one implementation they are considered to be included in the rate for the CPT of 13:15. For example, during the selected interval of 13:00-13:15 it would be acceptable for the allocated pick rate of 2,000 items to be utilized to pick 2,000 items in any combination for the CPTs of 13:15, 12:00, 10:30, 8:45, 01:15, 23:00 or 20:45. As another example, it would be acceptable for the pick rate of 1,000 items that was allocated for the CPT of 23:00 to be utilized to pick 1,000 items in any combination for the CPTs of 23:00 or 20:45, but not for any of the subsequent CPTs.

Figure 9:
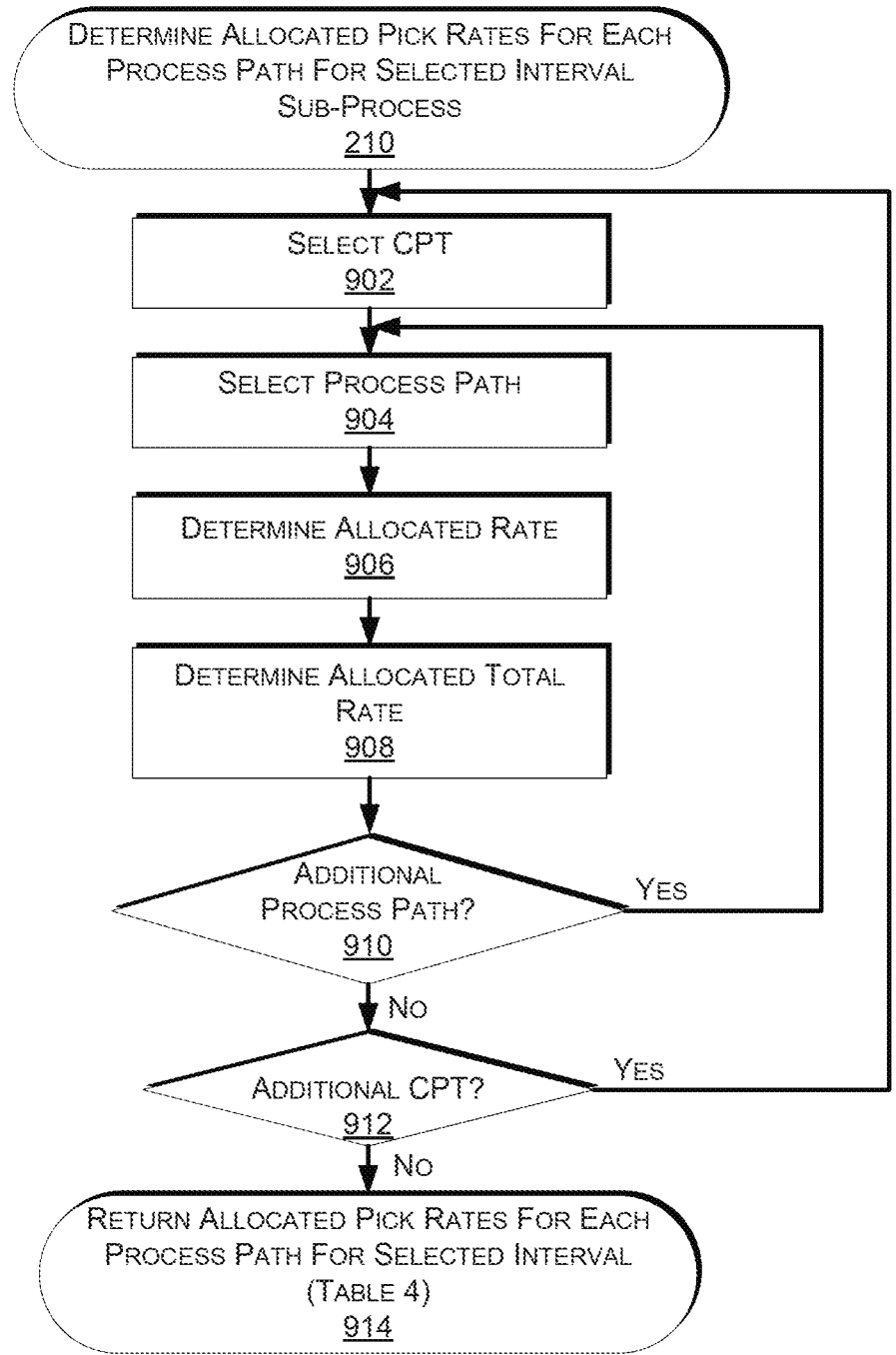
FIG. 9 is a flow diagram illustrating an example sub-process for determining allocated pick rates for each process path for a current interval, according to an implementation.

Finally, returning again to FIG. 2, once the allocation of pick rates associated with CPTs for a selected interval has been determined, allocated pick rates for each process path for the selected interval are determined, as in sub-process 210. Sub-process 210 is discussed with respect to FIG. 9 and Table 4 below. Sub-process 210 begins by selecting a CPT, as in 902, selecting a process path, as in 904, determining an allocated rate, as in 906, and determining an allocated total rate, as in 908. In one implementation, the allocated rate and allocated total rate may be determined by multiplying the process path distribution percentages of Table 2 by the allocated rate and allocated total rate of Table 3, respectively, for each CPT. Once the allocated rate and allocated total rate for the process path and CPT combination are determined, a determination is made as to whether any additional process paths for the CPT remain, as in 910. If it is determined that additional process paths for the CPT remain, the example sub-process returns to 904 and continues by selecting the next process path for the CPT. If no process paths remain for the CPT it may then be determined if any CPTs remain, as in 912. If any CPTs remain, the example sub-process returns to 902 and continues by selecting the next CPT. If no CPTs remain, the example sub-process may return the allocated pick rates for each process path for the selected interval, as in 914, after which the example process of FIG. 2 completes, as in 212. Table 4 is an example illustration of an allocation matrix for the allocated pick rates for each process path for the selected interval.

TABLE 4

| CPT | Allocate Rate | | Allocated total rate | |
|---|---|---|---|---|
| | PP1 | PP2 | PP1 | PP2 |
| 20:45 | 1000 | 2000 | 1000 | 2000 |
| 23:00 | 339 | 661 | 1339 | 2661 |
| 01:15 | 666 | 1334 | 2005 | 3995 |
| 08:45 | #N/A | #N/A | #N/A | #N/A |
| 10:30 | #N/A | #N/A | #N/A | #N/A |
| 12:00 | #N/A | #N/A | #N/A | #N/A |
| 13:15 | 653 | 1347 | 2658 | 5342 |

In various implementations, the time that it takes for labor to be moved from one location to another may also be considered in the planning of the pick rates. For example, after the allocations for the process paths are done as described above, the allocations may be reviewed with a goal of minimizing the cost for moving labor within the fulfillment center. Such considerations may be based on an evaluation of the costs for shifting the labor between the process paths and from one type of item or activity for each associated CPT. For example, it may be more efficient to have the picking of new items for a new CPT start at the beginning of a new work shift or after a break, in that the workers would not need to stop in the middle of a shift for moving to a different location.

While the above described example processes imply that analysis of the CPT's process paths and minimum suggested pick rates may be done serially, one or more of such CPT process paths and/or minimum suggested pick rates may be analyzed in parallel. In addition, the order of some of the sub-processes may be altered, such as performing the sub-process 210 prior to the sub-process 208. Furthermore, while the examples discussed above relate to a selected interval being a current time interval, in various implementations a future time interval may be selected for evaluation. For example, by looking ahead to a future time interval, a determination may be made as to what shifts in capacity (e.g., workers being moved to other stations) may need to be made, which can be utilized for various purposes, such as informing the workers ahead of time where they will be moving during their shifts.

In addition, while the examples discussed above relate to the determination of a minimum suggested pick rate for each CPT for each process path, in other implementations, other rates such as a minimum suggested pack rate or a minimum suggested production rate may be determined as an alternative or in addition thereto. For example, for pack rate planning, rather than determining the total items for each CPT (block 510, FIG. 5 and Total Items columns, Table 2) as including the actual items and forecasted items, the total items for each CPT may be the sum of the actual items, forecasted items and post-pick items. Likewise, for pack rate planning the time to CPT may add the time needed to route an item from post-pick to the transportation unit. Utilizing these and/or other modifications, the needed pack rate for each process path may be determined using the techniques discussed above. As another example, an on-demand production rate may be determined for the production of items, such as the printing of books in accordance with an on-demand printing process.

The processes discussed herein may be performed in a recurring manner and the needed pick rate updated for each occurrence. For example, the time period may update as each interval passes and the process may repeat, removing the past interval (as it has now occurred) and adding a new interval in the future. Likewise, as discussed above, the pick rate planning for the current interval may be periodically or continually updated to account for the portion of the interval that has passed.

Various operations of a pick rate planning system, such as those described herein, may be executed on one or more computer systems, interacting with various other devices in a materials handling facility, according to various embodiments. One such computer system is illustrated by the block diagram in FIG. 10. In the illustrated embodiment, a computer system 1000 includes one or more processors 1010A, 1010B through 1010N, coupled to a non-transitory computer-readable storage medium 1020 via an input/output (I/O) interface 1030. The computer system 1000 further includes a network interface 1040 coupled to an I/O interface 1030, and one or more input/output devices 1050. In some embodiments, it is contemplated that a pick rate planning system may be implemented using a single instance of the computer system 1000, while in other embodiments, multiple such systems or multiple nodes making up the computer system 1000 may be configured to host different portions or instances of a pick rate planning system. For example, in one embodiment, some data sources or services (e.g., determining actual number of items picked) may be implemented via one or more nodes of the computer system 1000 that are distinct from those nodes implementing other data sources or services (e.g., determining current picking capacity constraints). In some embodiments, a given node may implement the functionality of more than one component of a pick rate planning system.

In various embodiments, the computer system 1000 may be a uniprocessor system including one processor 1010A, or a multiprocessor system including several processors 1010A-1010N (e.g., two, four, eight, or another suitable number). The processors 1010A-1010N may be any suitable processor capable of executing instructions. For example, in various embodiments the processors 1010A-1010N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1010A-1010N may commonly, but not necessarily, implement the same ISA.

The non-transitory computer-readable storage medium 1020 may be configured to store executable instructions and/or data accessible by the one or more processors 1010A-1010N. In various embodiments, the non-transitory computer-readable storage medium 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within the non-transitory computer-readable storage medium 1020 as program instructions 1025 and data storage 1035, respectively. In other embodiments, program instructions and/or data may be received, sent or stored upon different types of computer-accessible media, such as non-transitory media, or on similar media separate from the non-transitory computer-readable storage medium 1020 or the computer system 1000. Generally speaking, a non-transitory, computer-readable storage medium may include storage media or memory media such as magnetic or optical media, e.g., disk or CD/DVD-ROM coupled to the computer system 1000 via the I/O interface 1030. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1040.

In one embodiment, the I/O interface 1030 may be configured to coordinate I/O traffic between the processors 1010A-1010N, the non-transitory computer-readable storage medium 1020, and any peripheral devices in the device, including the network interface 1040 or other peripheral interfaces, such as input/output devices 1050. In some embodiments, the I/O interface 1030 may perform any necessary protocol, timing or other data transformations to convert data signals from one component (e.g., non-transitory computer-readable storage medium 1020) into a format suitable for use by another component (e.g., processors 1010A-1010N). In some embodiments, the I/O interface 1030 may include support for devices attached through various types of peripheral buses, such as a variant of the Peripheral Component Interconnect (PCI) bus standard or the Universal Serial Bus (USB) standard, for example. In some embodiments, the function of the I/O interface 1030 may be split into two or more separate components, such as a north bridge and a south bridge, for example. Also, in some embodiments, some or all of the functionality of the I/O interface 1030, such as an interface to the non-transitory computer-readable storage medium 1020, may be incorporated directly into the processors 1010A-1010N.

The network interface 1040 may be configured to allow data to be exchanged between the computer system 1000 and other devices attached to a network, such as other computer systems, or between nodes of the computer system 1000. In various embodiments, the network interface 1040 may support communication via wired or wireless general data networks, such as any suitable type of Ethernet network. For example, the network interface 1040 may support communication via telecommunications/telephony networks such as analog voice networks or digital fiber communications networks, via storage area networks such as Fibre Channel SANs, or via any other suitable type of network and/or protocol.

Input/output devices 1050 may, in some embodiments, include one or more displays, projection devices, audio output devices, keyboards, keypads, touchpads, scanning devices, voice or optical recognition devices, or any other devices suitable for entering or retrieving data by one or more computer systems 1000. Multiple input/output devices 1050 may be present in the computer system 1000 or may be distributed on various nodes of the computer system 1000. In some embodiments, similar input/output devices may be separate from the computer system 1000 and may interact with one or more nodes of the computer system 1000 through a wired or wireless connection, such as over the network interface 1040.

Figure 10:
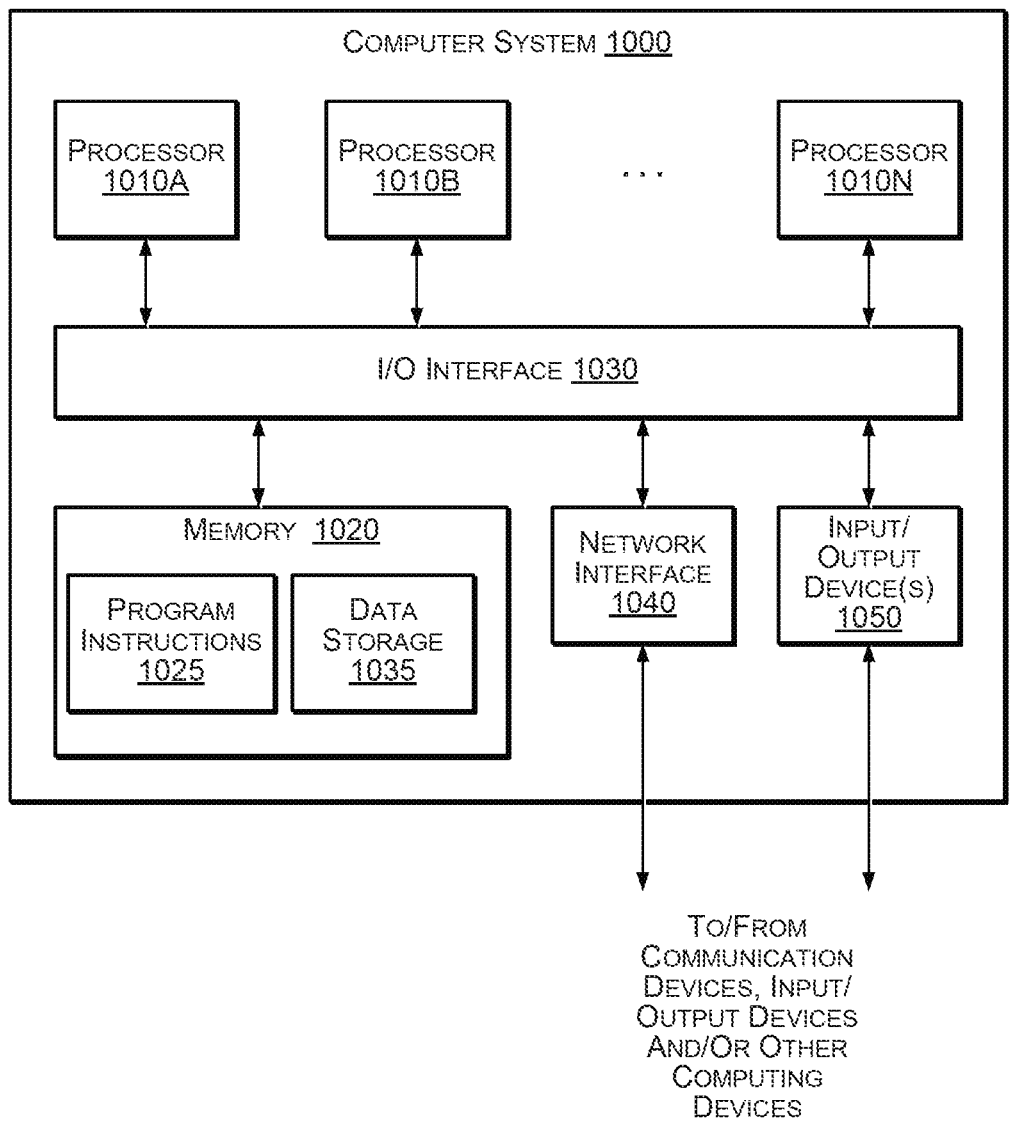
FIG. 10 is a block diagram illustrating an example computer system configured to implement one or more of the pick rate planning operations described herein.

As shown in FIG. 10, the memory 1020 may include program instructions 1025 which may be configured to implement a pick rate planning system and data storage 1035, which may comprise various tables, databases and/or other data structures accessible by the program instructions 1025. In one embodiment, the program instructions 1025 may include various software modules configured to implement a forecasting service, a planning service, and/or a transportation costing service. The data storage 1035 may include various data stores for maintaining historical picking rates for the materials handling facility, picking reports (not shown), actual or expected picking costs, avoidable picking costs, etc.

In various embodiments, the parameter values and other data illustrated herein as being included in one or more data stores may be combined with other information not described or may be partitioned differently into more, fewer, or different data structures. In some embodiments, data stores used in a pick rate planning system, or in components or portions thereof, may be physically located in one memory or may be distributed among two or more memories. These memories may be part of a single computer system or they may be distributed among two or more computer systems, such as two computer systems connected by a wired or wireless local area network, or through the Internet, in different embodiments. Similarly, in other embodiments, different software modules and data stores may make up a pick rate planning system and/or any of the various components thereof described herein.

Users may interact with the pick rate planning system (and/or various components thereof) in various ways in different embodiments, such as to provide historical information, select time periods and/or intervals. For example, some users may have physical access to the computing system 1000, and if so, may interact with various input/output devices 1050 to provide and/or receive information. Alternatively, other users may use client computing systems to access the pick rate planning system and/or its constituent components, such as remotely via the network interface 1040 (e.g., via the Internet and/or the World Wide Web). In addition, some or all of the pick rate planning system components may provide various feedback or other general types of information to users (e.g., in response to user requests) via one or more input/output devices 1050.

Those skilled in the art will appreciate that the computing system 1000 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. The computing system 1000 may also be connected to other devices that are not illustrated, or instead may operate as a stand-alone system. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other embodiments, some or all of the software components may execute in memory on another device and communicate with the illustrated computing system via inter-computer communication. Some or all of the system components or data structures may also be stored (e.g., as instructions or structured data) on a non-transitory, computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the techniques described herein may be practiced with other computer system configurations.

Those skilled in the art will appreciate that in some embodiments the functionality provided by the methods and systems discussed above may be provided in alternative ways, such as being split among more software modules or routines or consolidated into fewer modules or routines. Similarly, in some embodiments, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered. The various methods and systems as illustrated in the figures and described herein represent example embodiments. The methods and systems may be implemented in software, hardware, or a combination thereof in other embodiments. Similarly, the order of any method may be changed and various elements may be added, reordered, combined, omitted, modified, etc., in other embodiments.

From the foregoing, it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer-readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system for allocating pick rates for picking items from inventory to be routed through a materials handling facility, the system comprising:
   a materials handling facility including inventory comprising items and also including a plurality of process paths through which items are routed; and
   a computing system, comprising:
      one or more processors; and
      a memory coupled to the one or more processors and storing program instructions that when executed by the one or more processors cause the one or more processors to at least:
      determine available picking capacity of the materials handling facility for a time period that begins at a beginning time and ends at an ending time and comprises one or more work shift capacity regions that are divided into work shift time intervals;
      determine first and second pluralities of items that need to be picked by respective first and second critical pull times during the time period to be routed through one or more of the process paths of the materials handling facility so that the first and second pluralities of items may be delivered to respective first and second transportation units before respective departure times so that the first and second pluralities of items may be transported by the respective first and second transportation units, wherein the second critical pull time occurs after the first critical pull time;
      allocate one or more pick rates corresponding to a first picking region of the picking capacity for picking the first plurality of items by the first critical pull time, the first picking region comprising:
         a portion of the picking capacity occurring between the beginning time and the first critical pull time and having a first pick rate over the corresponding work shift time intervals;
      after the one or more pick rates corresponding to the first picking region are allocated, allocate one or more pick rates corresponding to a second picking region of the picking capacity that may be utilized for picking the second plurality of items by the second critical pull time, the second picking region comprising:
         a portion of the picking capacity occurring between the first critical pull time and the second critical pull time and having a second pick rate over the corresponding work shift time intervals that is equal to the first pick rate; and
         a portion of the picking capacity occurring between the beginning time and the second critical pull time and having a third pick rate over the corresponding work shift time intervals, wherein the portions of the picking capacity of the second picking region result in a level filling of the remaining available picking capacity between the beginning time and the second critical pull time after the first picking region is allocated; and route picked items of the first and second plurality of items through one or more of the process paths of the materials handling facility to be delivered to the respective first and second transportation units before the respective departure times so that the first and second plurality of items may be transported by the respective first and second transportation units.

2. The system of claim 1, wherein the total combined pick rate of the first and second picking regions for the work shift time interval immediately before the first critical pull time is equal to the total combined pick rate of the second picking region for the work shift time interval immediately after the first critical pull time.

3. The system of claim 1, wherein as a result of a capacity constrained condition occurring due to a first set of work shift time intervals having higher pick rate capacities than a second set of work shift time intervals, the second picking region further comprises a portion of the picking capacity occurring in the first set of work shift time intervals and having a fourth pick rate over the first set of work shift time intervals.

4. The system of claim 1, wherein the program instructions when executed by the one or more processors further cause the one or more processors to:

determine third and fourth pluralities of items that need to be picked by respective third and fourth critical pull times during the time period, wherein the third critical pull time occurs after the second critical pull time and the fourth critical pull time occurs after the third critical pull time;

after the one or more pick rates corresponding to the second picking region are allocated, allocate one or more pick rates corresponding to a third picking region of the picking capacity that may be utilized for picking the third plurality of items by the third critical pull time, the third picking region having a starting time that occurs after the beginning time; and after the one or more pick rates corresponding to the third picking region are allocated, allocate one or more pick rates corresponding to a fourth picking region of the picking capacity that may be utilized for picking the fourth plurality of items by the fourth critical pull time, the fourth picking region having a starting time that occurs before the starting time of the third picking region.

5. The system of claim 4, wherein a work shift time interval that begins at the beginning time includes part of the fourth picking region but does not include part of the third picking region.

6. The system of claim 5, wherein the work shift time interval that begins at the beginning time is a current time interval.

7. A computing system, comprising:
one or more processors; and
a memory coupled to the one or more processors and storing program instructions that when executed by the one or more processors cause the one or more processors to:

determine available picking capacity of a materials handling facility for a time period, the materials handling facility including inventory comprising items and also including a plurality of process paths through which the items are routed;

determine pluralities of items that are associated with critical pull times that occur during the time period, each of the critical pull times identifying a time by which the associated plurality of items must be picked from inventory to be routed through one or more process paths of the materials handling facility so that the associated plurality of items may be delivered to an associated delivery location within the materials handling facility by an associated delivery time that is related to a departure time of an associated transportation vehicle that is to transport the associated plurality of items;

allocate pick rates corresponding to picking regions of the available picking capacity that may be utilized for picking the pluralities of items by the associated critical pull times, wherein each critical pull time is associated with a picking region and the pick rates are allocated in order of the associated critical pull times, and each respective picking region comprises one or more portions of the picking capacity with one or more corresponding pick rates that are allocated to achieve a level filling of the remaining available picking capacity up to the associated critical pull time when the respective one or more pick rates are allocated; and route items that are picked according to the allocated pick rates through one or more of the process paths of the materials handling facility to be delivered to the associated delivery locations by the associated delivery times.

8. The computing system of claim 7, wherein:
the critical pull times include first and second critical pull times with associated first and second picking regions, respectively, and the second critical pull time occurs after the first critical pull time;
the first picking region comprises a portion of the picking capacity occurring between a beginning time of the time period and the first critical pull time; and
the second picking region comprises a portion of the picking capacity occurring between the first critical pull time and the second critical pull time.

9. The computing system of claim 8, wherein the second picking region further comprises a portion of the picking capacity occurring between the beginning time and the second critical pull time.

10. The computing system of claim 8, wherein:
the critical pull times further include a third critical pull time with an associated third picking region, the third critical pull time occurring after the second critical pull time; and
a starting time of the third picking region occurs before a starting time of the second picking region.

11. The computing system of claim 7, wherein the program instructions when executed by the one or more processors further cause the one or more processors to stop allocating pick rates when a capacity constrained condition occurs for a current time interval of the time period, the capacity constrained condition indicating that there is no more available picking capacity for the current time interval.

12. The computing system of claim 7, wherein the time period comprises sequential first and second work shift time intervals with respective first and second pick rate capacities, and at least one picking region that is associated with a critical pull time has a first allocated pick rate in the first work shift time interval and a second allocated pick rate in the second work shift time interval.

13. The computing system of claim 12, wherein the first pick rate capacity is different than the second pick rate capacity and the first allocated pick rate is equal to the second allocated pick rate.

14. The computing system of claim 12, wherein the first pick rate capacity is different than the second pick rate capacity and the first allocated pick rate is the same percentage of the first pick rate capacity as the second allocated pick rate is of the second pick rate capacity.

15. The computing system of claim 7, wherein the program instructions when executed by the one or more processors further cause the one or more processors to determine portions of at least one of the allocated pick rates to be allocated between at least two respective process paths.

16. A computer implemented method to allocate rates related to processing items in a materials handling facility, the materials handling facility including inventory comprising items and also including a plurality of processing paths through which the items are routed, the computer implemented method comprising:
    under control of one or more computing systems configured with executable instructions,
        determining available capacity of the materials handling facility as related to processing items for a time period;
        determining a plurality of items that are associated with critical pull times that occur during the time period, each critical pull time identifying an associated delivery time by which associated items from the plurality of items are to be at an associated delivery location within the materials handling facility, wherein each associated delivery time is related to a departure time of an associated transportation vehicle that is to transport the associated items;
        determining at least one process path for routing items from the plurality of items through the materials handling facility;
        allocating one or more rates corresponding to a capacity region of the available capacity to each critical pull time, wherein the rates are allocated in order of the associated critical pull times, and each respective capacity region comprises one or more portions of the capacity with one or more corresponding rates that are allocated to achieve a level filling of the remaining available capacity up to the associated critical pull time when the respective one or more rates are allocated; and
        routing the plurality of items for processing along the at least one process path according to the allocated rates so that each item of the plurality of items is delivered to the associated delivery location by the associated delivery time.

17. The computer implemented method of claim 16, wherein:
    the critical pull times include first, second and third critical pull times with associated first, second and third capacity regions, respectively, and the second critical pull time occurs after the first critical pull time and the third critical pull time occurs after the second critical pull time; and
    a starting time of the third capacity region occurs before a starting time of the second capacity region.

18. The computer implemented method of claim 16, wherein the processing of the items includes picking the items and the allocated rates are pick rates.

19. The computer implemented method of claim 16, wherein the processing of the items includes packing the items and the allocated rates are pack rates.

20. The computer implemented method of claim 16, wherein the processing of the items includes producing the items according to an on-demand process and the allocated rates are production rates.

* * * * *